UNITED STATES PATENT OFFICE.

AUGUSTE CORNAND AND HENRI VAN DE CRUYS, OF BRUSSELS, BELGIUM.

SOLDERING AND WELDING MATERIALS.

1,092,340.     Specification of Letters Patent.     Patented Apr. 7, 1914.

No Drawing. Application filed March 23, 1911, Serial No. 616,391. Renewed January 23, 1914. Serial No. 814,002.

*To all whom it may concern:*

Be it known that we, AUGUSTE ALEXANDRE CORNAND, residing at Château de Zellick par Berchem Ste. Agathe lez Bruxelles, Brussels, Belgium, and HENRI VAN DE CRUYS, residing at 226 Rue Haeck, Brussels, Belgium, subjects of the King of Belgium, have invented certain new and useful Improvements in Soldering and Welding Materials.

The present invention relates to improvements in soldering and welding materials for aluminum: and it comprises an alloy of the four metals indicated below which permits the soldering and welding operation to be carried out at relatively low temperatures.

The invention is illustrated by the following specific example which shows one embodiment thereof, the four metals used in producing the alloy,—zinc, aluminum, tin and nickel—being combined in substantially the following proportions:

| | | | |
|---|---|---|---|
| 52 | parts by weight of pure zinc. | | |
| 17.5 | " | " | " aluminum. |
| 30 | " | " | " Banca tin. |
| 0.5 | " | " | " nickel. |
| 100. | | | |

The nickel may be replaced by an equal amount of German silver, (white copper).

The presence of the tin and nickel enables the solder to be melted at a lower temperature, and hence enables the soldering operation to be carried out at relatively low temperatures. The solder is moreover very satisfactory in operation and adheres firmly to the places to which applied. The new composition or alloy can be used without acids or welding powders.

We claim:

1. A soldering and welding alloy for aluminum made up of the following four metals,—aluminum, tin, nickel, and zinc.

2. A soldering and welding alloy for aluminum made up of the following metals in substantially the following proportions.—aluminum 17.5 parts, zinc 52 parts, tin 30 parts, and nickel 0.5 parts.

In testimony whereof we have hereunto set our hands in presence of two witnesses.

AUGUSTE CORNAND.
HENRI VAN DE CRUYS.

Witnesses:
M. GERBAULD,
EMILE VAN WANRECH.